July 9, 1929.  V. VIEWEG  1,720,582
DEVICE FOR MEASURING TORSION
Filed Dec. 29, 1926
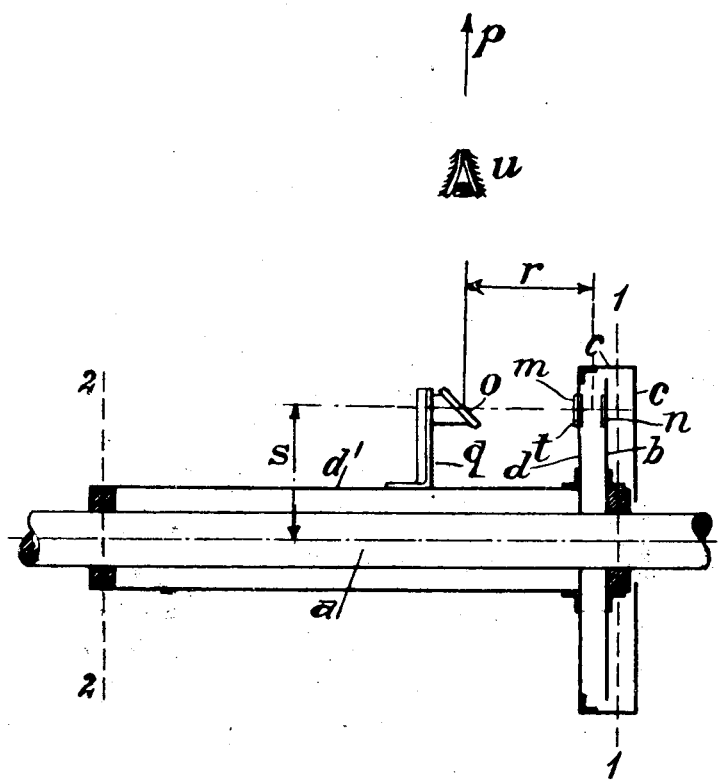

Patented July 9, 1929.

1,720,582

UNITED STATES PATENT OFFICE.

VOLKMAR VIEWEG, OF CHARLOTTENBURG, NEAR BERLIN, GERMANY.

DEVICE FOR MEASURING TORSION.

Application filed December 29, 1926, Serial No. 157,827, and in Germany October 29, 1924.

For the measurement of forces various devices are known which are based on the observation of the torsion of a resilient part. These instruments have, however, in general the disadvantage that the members serving for indicating the force in rotating produce losses due to the eddying of the air and such disturbances have an adverse effect in certain measurements.

The invention has for its object the avoidance of this disadvantage.

Thus there exists torsion indicators in which the twist of the resilient part between two measuring cross sections is determined. With the measuring cross section there are associated parts serving for indication of the torsion and thus of the forces acting.

Under the present invention the parts of the instrument connected with the one measuring cross section and rotating therewith are enclosed by parts which are connected with the other measuring cross section and rotating therewith as by a casing. Within this casing air friction is not produced and the enclosed parts have no motion relative to the walls. On the side of the measuring cross section connected with the enclosed parts which according to the purpose of the measurement is located adjacent the driven or the driving side of the rotating system, the instrument is free from losses due to air friction.

The arrangement of a torsion indicator as a casing is not unusual but in such indicators as have been proposed a stationary lamp or fixed source of light is provided which produces air friction which it is the object of the present invention to avoid. In apparatus employing a stationary housing naturally air friction will be produced.

The application of the invention to a torsion indicator is illustrated in the accompanying diagram. As shown the disc $b$, connected with the measuring cross section 1—1 of the shaft $a$ and serving for indicating the torsion and thus the force acting, is totally enclosed as by a casing by parts $c$ which are secured to the disc $d$ which also serves for indicating purposes and are thereby connected with the other measuring cross section 2—2.

The relative motion between the parts $b$ and $d$ can be observed in the same manner as has been explained in applicant's copending application Ser. No. 62864 of which the present application is a division.

For observing the means relative torsion of the two cross sections 1 and 2 the disc $d$ is provided with an opening $m$ in the middle of which an index thread $t$ is fastened. Opposite to said opening $m$ on the adjacent side of the disc $b$ a scale $n$ is provided for. Also corresponding to the opening $m$, a mirror $o$ with an inclination of 45 degrees is secured to the projecting part $d'$ of the disc $d$ by means of a fastening device $q$ and the distance $r$ from the middle of the mirror $o$ to the space between the disc $b$ and $d$ being equal to the distance $s$ from the middle of the mirror $o$ to the middle of the shaft $a$.

If the shaft $a$ is rotating with both measuring cross-sections 1 and 2, an eye $u$ being in the direction $p$ can observe in the moving mirror $o$ the degree of the mean relative torsion of the cross-sections 1 and 2 owing to the displacing of the index-thread relative to the scale $n$.

What I claim is:

Device for avoiding the air eddy losses of torsion measuring instruments for a transmission shaft, said device including parts connected to the one cross-section of the shaft and parts connected with another cross-section of the shaft, said last-mentioned parts totally enclosing said first-mentioned parts.

In testimony whereof I have signed my name to this specification.

VOLKMAR VIEWEG.